United States Patent Office 3,538,767
Patented Nov. 10, 1970

3,538,767
FLOWMETER FLUID DRIVE
Robert A. Pustell, Melrose, and Richard A. Pfuntner, Tewksbury, Mass., assignors to General Electric Company, a corporation of New York
Filed Dec. 4, 1968, Ser. No. 781,158
Int. Cl. G01f 1/00
U.S. Cl. 73—194                                   9 Claims

ABSTRACT OF THE DISCLOSURE

A mass flowmeter of the angular momentum type having a flow-regulated swirl generator for imparting angular velocity to the metered fluid. The swirl generator has a set of fixed vanes in the fluid flow stream and means for causing part of the fluid to flow around the vanes at high flow rates to avoid excessive swirl velocity.

BACKGROUND OF THE INVENTION

The present invention relates to mass flowmeters of the angular momentum type having a swirl generator for imparting swirl to the measured fluid and a torque balance reaction turbine for removing the swirl. More particularly, the invention relates to mass flowmeters of the above-mentioned type having an improved swirl generator construction.

Mass flowmeters of the angular momentum type are now widely used on aircraft for measuring the mass flow rate of fuel supplied to the aircraft engines. Such flowmeters comprise a casing through which the measured fluid flows and in which are mounted a swirl generator and a reaction turbine. The swirl generator imparts angular momentum or swirl to the fluid which is removed by a reaction turbine restrained from rotation by a suitable restraining means. Since the fluid torque exerted in the reaction turbine is proportional to the product of the mass flow rate and the angular velocity of the fluid, the mass flow rate can be determined by the deflection of the reaction turbine against the balancing force of the restraining means if corrections are made for changes in angular velocity of the fluid.

Heretofore, it has been common practice to use an impeller driven by a constant speed motor as a swirl generator for imparting swirl to the measured fluid. Such an arrangement is shown, for example, in U.S. Pat. 2,714,310 Jennings assigned to the same assignee as the present invention. To reduce cost and complication efforts have been made to substitute for the motor driven impeller a swirl generator which uses the energy of the flowing fluid to generate swirl. Typically such swirl generators utilize a set of skewed vanes disposed in the fluid flow stream. A problem encountered with the use of such swirl generators is that when fixed vanes are used the swirl velocity increases as the flow rate increases. Thus, at high flow rates an excessive torque must be applied to the reaction turbine by the restraining means. This complicates the design and adds expense. To overcome this problem it has been proposed heretofore to provide flow rate responsive means for automatically reducing the skew angle of the vanes and hence swirl velocity at high flow rates. However, such a skew angle vane control system adds undesirable complication which may adversely affect reliability of the flowmeter system.

Accordingly, it is an object of the present invention to provide a mass flowmeter of the angular momentum type having an improved swirl generator which does not require either a constant speed drive motor or adjustable vanes to prevent excessive swirl velocity at high flow rates.

A further object of the invention is to provide a flow regulated swirl generator for a mass flowmeter which is reliable, has few moving parts and can be manufactured at low cost.

Further objects and advantages of the invention will become apparent as the following description proceeds.

SUMMARY

Briefly, in accordance with the present invention there is provided a mass flowmeter with a swirl generator having a set of fixed skewed vanes disposed in the fluid flow path. At low flow rates substantially all of the flowing fluid is guided through the vanes and so has swirl velocity imparted thereto. The swirl generator has a nose portion upstream from the vanes which at high flow rates directs a part of the flowing fluid around the vanes so that the average swirl velocity downstream from the swirl generator is reduced thereby preventing excessive swirl velocity. In order to obtain adequate swirl velocity at low rates a conduit having a discharge end surrounding the swirl generator is used to guide fluid through the vanes. The discharge end of the conduit is formed of flexible fingers which deflect in response to pressure from fluid directed by the nose portion to permit a portion of the fluid to flow around the vanes. To insure that the fluid downstream from the swirl generator has a uniform angular velocity a rotating turbine having axial flow channels is interposed between the swirl generator and the reaction turbine of the flowmeter.

For a better understanding of the invention reference should be made to the following detailed description taken in connection with the accompanying drawings.

DESCRIPTION OF THE PREFERRED EMBODIMENT

Figure 1:
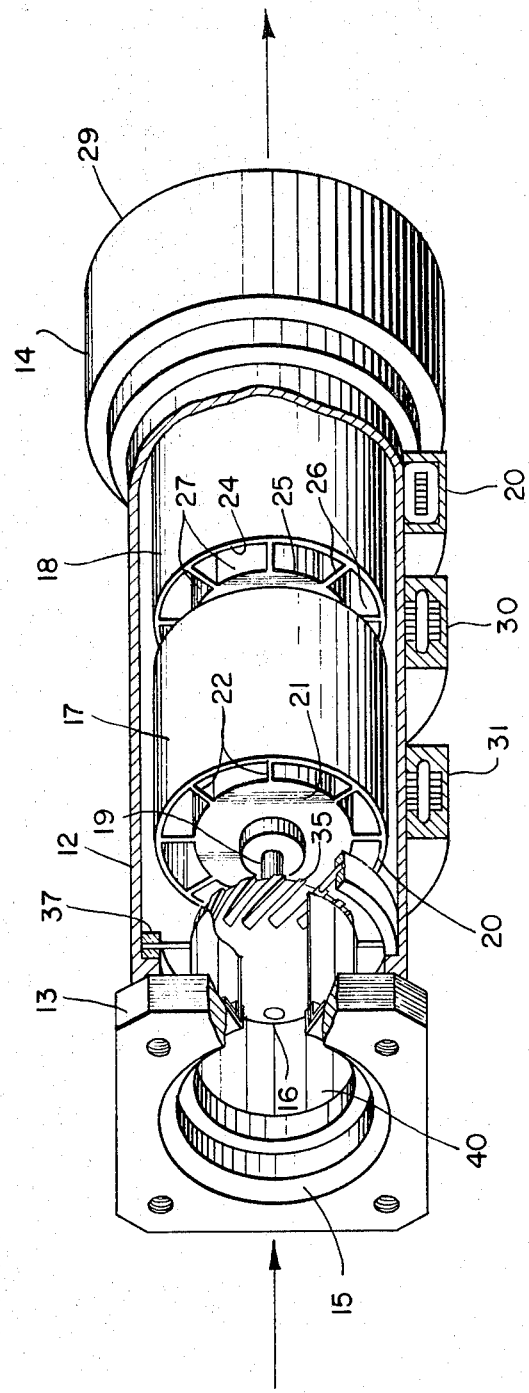
FIG. 1 is a cutaway perspective view of a mass flowmeter having a flow-regulated swirl generator embodying the present invention.

Referring to FIG. 1 of the drawing there is disclosed a mass flowmeter of the angular momentum type embodying the present invention. The flowmeter has a cylindrical casing 12 having end flanges 13 and 14 adapted to be connected to a conduit through which there is a flow of fluid to be metered. Fluid entering an inlet end 15 flows past a swirl generator 16 which imparts an angular velocity or swirl to the fluid.

Located downstream from the swirl generator 16 are a speed turbine 17 and a reaction turbine 18 which are coaxially mounted for rotation on a shaft 19 by means of suitable bearings (not shown). As shown the speed turbine 17 is interposed between the swirl generator 15 and the reaction turbine in the fluid flow stream.

The speed turbine 17 has an outer cylindrical shroud 20 spaced from a hub 21 by means of radial vanes 22 which form longitudinal flow channels 23. Swirling fluid from swirl generator 16 impinges on vanes 22 causing rotation of the speed turbine 17 and then passes through flow channels 23 leaving the turbine on the downstream side. The flow channels 23 are sufficiently long so that the fluid leaving the turbine has a uniform angular velocity which is also equal to the rotating speed of the turbine.

The reaction turbine 18 is similar in construction to the speed turbine 17 and comprises an outer cylindrical shroud 24 spaced from a hub 25 by means of radial vanes 26 which form longitudinal flow channels 27. Swirling fluid leaving the speed turbine 17 impinges on vanes 26 causing deflection of the reaction turbine which is restrained by suitable means such as an electromagnetic torque motor 28. The fluid then passes through the flow channels 27 and after leaving the downstream side of the reaction turbine leaves the outlet end 29 of the flowmeter.

The apparatus for indicating the mass flow rate is not shown since it forms no part of the present invention. It may be noted, however, that mass flowmeters of the type described above operate on the principle that the reaction turbine, being restrained, removes the angular momentum of the swirling fluid and experiences a torque proportional to the product of the mass flow rate and the swirl velocity of the fluid. This torque is balanced by the restraining means such as torque motor 28 whose output is a function of deflection of the reaction turbine 18 which deflection may be measured by suitable means such as a position pickoff 30. If the swirl velocity varies as it does with a fixed vane type swirl generator, it is necessary to introduce a swirl speed correction factor and for this purpose there is provided a speed turbine pickoff 31 which generates a speed signal proportional to speed of the speed turbine 17 which is also proportional to the swirl velocity of the fluid discharged therefrom as mentioned above. A known system for indicating mass flow rate is to divide the signal from the reaction turbine pickoff 30 which, without speed correction, is proportional to the product of the mass flow rate $\dot{M}$ and the swirl velocity W (i.e. $\dot{M}$W) by the signal from the speed turbine pickoff 31 which is proportional to swirl velocity W.

Thus $$\frac{\dot{M}W}{W} = \dot{M}$$

Another system to indicate mass flow rate is to introduce the speed signal into a servo loop that controls the torque motor so that the balancing torque is proportional to the product of the speed and position signals from pickoffs 30 and 31. The signal from pickoff 30 then indicates mass flow rate directly and is not affected by swirl velocity changes. Such an arrangement is disclosed and claimed in a copending application serial number of C. F. Taylor and D. M. Bauer (Docket 52–EE–0–34) filed and assigned to the same assignee as the present invention.

Both systems for indicating mass flow rate require the restraining means to provide a balancing torque equal to the fluid momentum torque which is proportional to the swirl velocity. Where the swirl velocity is provided by fixed vanes disposed in the fluid flow path, as distinguished from an impeller driven by a constant speed motor, the swirl velocity tends to become excessive at high flow rates. This requires a high torque output from the restraining means such as torque motor 28 which is costly and hence undesirable. According to the present invention an arrangement is provided whereby the swirl velocity is automatically controlled to remain in the desired velocity range for various flow rates and this construction will now be described.

Figure 2:
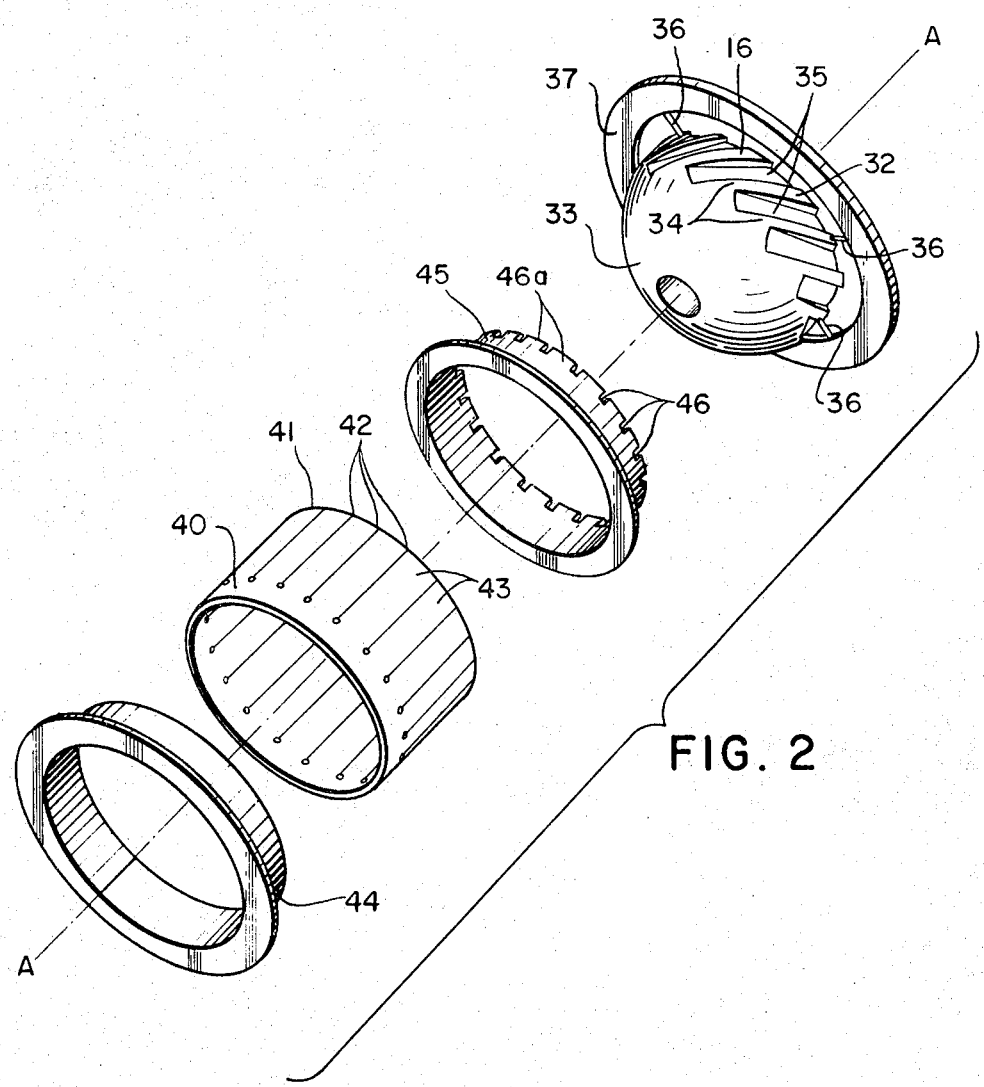
FIG. 2 is an exploded perspective view showing certain construction details of the swirl generator.
Figure 3:
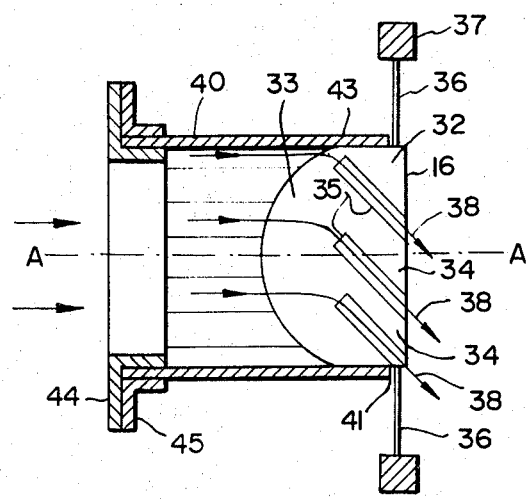
FIG. 3 is a side elevation view, partly in section, of the swirl generator for a low flow rate condition.
Figure 4:
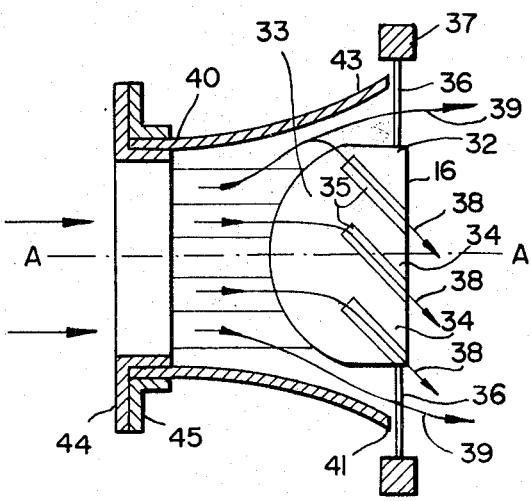
FIG. 4 is similar to FIG. 3 except that it illustrates a high flow rate condition.

Referring now to FIGS. 2, 3 and 4 of the drawing the swirl generator 16 has a base 32 and a nose portion 33 the outer surfaces of which may be, as shown, surfaces of revolution about an axis A—A. The axis A—A is preferably coincident with the axes of the cylindrical casing 12 and the turbine shaft 19 to insure symmetrical fluid swirl about the aforesaid axes. Located around the periphery of the base 32 are a plurality of vanes 34 which are skewed at an angle to the axis A—A. The vanes may, as shown, be formed by milling slots 35 in the base. The swirl generator is supported in casing 12 by struts 36 extending radially inward from a supporting ring 37.

Fluid entering inlet end 15 of the flowmeter impinges first on the nose portion 33 which directs the fluid radially outward until it reaches the slots 35 between vanes 34 in the base 33. At low flow rates (FIG. 3) it then flows in a first flow path through slots 35 and is discharged downstream from the swirl generator as indicated by arrows 38. Because the slots and vanes are skewed the flowing fluid has a swirl velocity imparted thereto. At higher flow rates (FIG. 4) a part of the fluid flows in a second flow path indicated by arrows 39 around the vanes and slots because of inertial effects and so does not have swirl imparted thereto. This has the effect of reducing the average swirl velocity of the total fluid downstream of the swirl generator with respect to the swirl velocity of that part of the fluid flowing through slots 35. In this manner the swirl velocity of the fluid entering reaction turbine 18 is prevented from becoming excessive at high flow rates. This, in turn, obviates the need for a correspondingly high torque output from torque motor 28 with resulting cost savings in the electrical components of the torque balancing system.

In order to obtain accurate flow rate readings at the low flow rate end of the measurement range, it is desirable to obtain substantial swirl velocity at low flow rates. This is accomplished by use of a cylindrical conduit 40 having a discharge end 41 which, at low flow rates surrounds and bears against the base 33 of the swirl generator and thus forces all of the incoming fluid into the first path through slots 35. The discharge end 41 of the conduit 40 has a plurality of resilient fingers 43 which deflect as shown in FIG. 4 at high flow rates in response to fluid pressure developed by the fluid directed outwardly by the nose portion 33. This permits some of the fluid to flow through the second path indicated by arrows 39 to reduce the average swirl velocity as explained above.

In order to mount the slotted conduit 40 centrally in the flow stream the upstream end is slid over a flanged ring 44. A second flanged ring 45 is then slid over the assembly. The abutting flanges of the rings may then be secured together as by welding or soldering. Notches 46 cut in ring 45 facilitate assembly and provide clamping friction. Also, the portions 46–A between the notches 45 establish definite bending points for the resilient fingers 43. Preferably the conduit 40 and the resilient fingers 43 are formed of a suitable elastic material that is nonmagnetic, inert chemically and has the ability to withstand many flexures without encountering the fatigue limit. One such material found to be satisfactory for this purpose is an alloy sold commercially by the American Gage and Machine Company, Elgin, Ill., under the name Elgiloy. This alloy consists of 40% cobalt, 20% chromium, 15% nickel, 7% molybdenum, 2% manganese, 0.15% carbon, 0.04% beryllium and the balance iron. The flanged assembly is centrally mounted in the flow stream adjacent the inlet end 15 of the flowmeter by a clamping means (not shown) so that the discharge end 41 of the conduit 40 surrounds the swirl generator 16.

Figure 5:
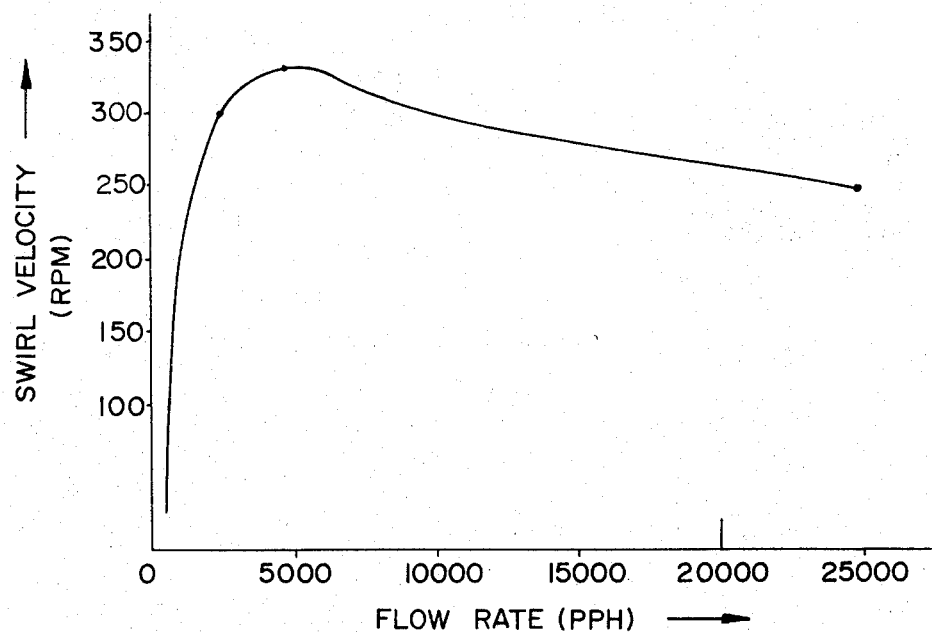
FIG. 5 is a graph showing the relationship between swirl velocity and flow rate useful in explaining the operation of the invention.

The action of the swirl generator 16 and conduit 40 in preventing excessive swirl velocity at high flow rates while providing adequate swirl velocity at low flow rates is clearly shown by the graph of FIG. 5. This graph shows how the swirl velocity, as measured by the speed of turbine 17, varied over a flow range of near zero to 25,000 pounds per hour (p.p.h.) during tests made on a flowmeter embodying the swirl generator construction described above. Referring to the graph it will be noted that the swirl velocity rose rapidly to about 330 r.p.m. at 5,000 p.p.h. after which the swirl velocity gradually fell off to about 240 r.p.m. at the maximum flow rate of 25,000 p.p.h. The fall off in the turbine speed after 5,000 p.p.h. flow rate was caused by the flow of an increasing portion of the fluid around the vanes 34 and slots 35 this being permitted by the enlargement of the discharge end 41 of conduit 40 by the deflection of spring fingers 43 under influence of fluid pressure as illustrated in FIG. 4.

Because the fluid discharged downstream from the swirl generator 16 in the first flow path indicated by arrows 38 has a swirl velocity different from that of the fluid flowing in the second flow path indicated by arrows 39 it is desirable to provide means for establishing a uniform average swirl velocity of the fluid before it enters the reaction turbine 18 for flow rate measurement purposes. As explained above this is accomplished by use of the speed turbine 17 whose rotating speed also provides a convenient measure of the average swirl velocity which is measured by speed pickoff 30. Where the swirl velocity varies with flow rate as shown for example by FIG. 5 compensation for swirl velocity rate is required for accurate mass flow rate indication. Thus, the speed turbine 17 performs the dual functions of averaging the swirl velocity and providing a speed correction signal.

While there has been shown and described in FIGS. 1–4 what is at present considered to be a preferred embodiment of the invention, it will be apparent to those skilled in the art that various changes and modifications may be made therein without departing from the spirit or scope of the invention.

What is claimed as new and desired to be secured by Letters Patent of the United States is:

1. In a mass flowmeter of the angular momentum type having a restrained reaction turbine disposed in the path or swirling fluid for measurement of mass flow rate;
   (a) a swirl generator in a fluid flow path upstream from said reaction turbine, said swirl generator having a set of fixed vanes disposed at an angle to the flow stream to impart swirl to the flowing fluid, and
   (b) regulating means responsive to fluid flow rate for adjusting the average swirl velocity of the fluid, said regulating means comprising a conduit arranged to conduct fluid to said swirl generator,
      (1) said conduit having a discharge end surrounding said vanes and guiding fluid through said vanes, and
      (2) said conduit being constructed and arranged to form a discharge path for part of said fluid around said vanes as the flow rate increases whereby to reduce the average swirl generator with respect to the swirl velocity of that part of the fluid discharged through said vanes.

2. The flowmeter construction as recited in claim 1 wherein a portion of the conduit is provided with longitudinal slots arranged to form therebetween resilient fingers which deflect in response to fluid pressure.

3. The flowmeter construction as recited in claim 2 wherein the swirl generator has a nose portion arranged to direct fluid impinging thereon into contact with the resilient fingers of the conduit to cause deflection thereof.

4. The flowmeter construction as set forth in claim 3 wherein the vanes are formed by slots in the outer portion of the swirl generator.

5. The flowmeter construction as recited in claim 1 including a turbine interposed between the swirl generator and the reaction turbine having flow channels parallel to the rotation axis of the turbine whereby fluid discharged from the turbine has a uniform swirl velocity.

6. In a mass flowmeter of the angular momentum type having a restrained reaction turbine disposed in the path of a swirling fluid for measurement of mass flow rate;
   (a) a swirl generator upstream from said reaction turbine comprising,
      (1) a base portion having skewed vanes around the periphery thereof, and
      (2) a nose portion for directing a part of the fluid around the vanes, and
   (b) a conduit for guiding fluid to said swirl generator having a discharge end adjacent said swirl generator whereby a part of the fluid flowing through said conduit is directed in a first path between said vanes and has swirl imparted thereto and a part of the fluid flows outside of said vanes without swirl velocity, the ratio of the amount of fluid flowing in said first and second paths varying as a function of the fluid flow velocity through said conduit.

7. A mass flowmeter construction as set forth in claim 6 wherein the conduit is constructed and arranged to permit progressive enlargement of its discharge end in response to increasing fluid pressure therein.

8. A mass flowmeter construction as set forth in claim 6 wherein the conduit is provided with longitudinal slots arranged to form therebetween resilient fingers which deflect in response to fluid pressure.

9. A mass flowmeter construction as set forth in claim 6 including a turbine interposed between the swirl generator and the reaction turbine having flow channels parallel to the axis of rotation of the turbine whereby fluid discharged from the turbine has a uniform swirl velocity.

References Cited
FOREIGN PATENTS 568,613 3/1924 France.
615,210 12/1926 France.

RICHARD C. QUEISSER, Primary Examiner

J. K. LUNSFORD, Assistant Examiner

U.S. Cl. X.R.

73—231